Feb. 13, 1934.  E. C. McFARLANE  1,947,211
METHOD OF AND APPARATUS FOR CONVEYING SHEET MATERIAL
Filed Aug. 27, 1931  6 Sheets-Sheet 1
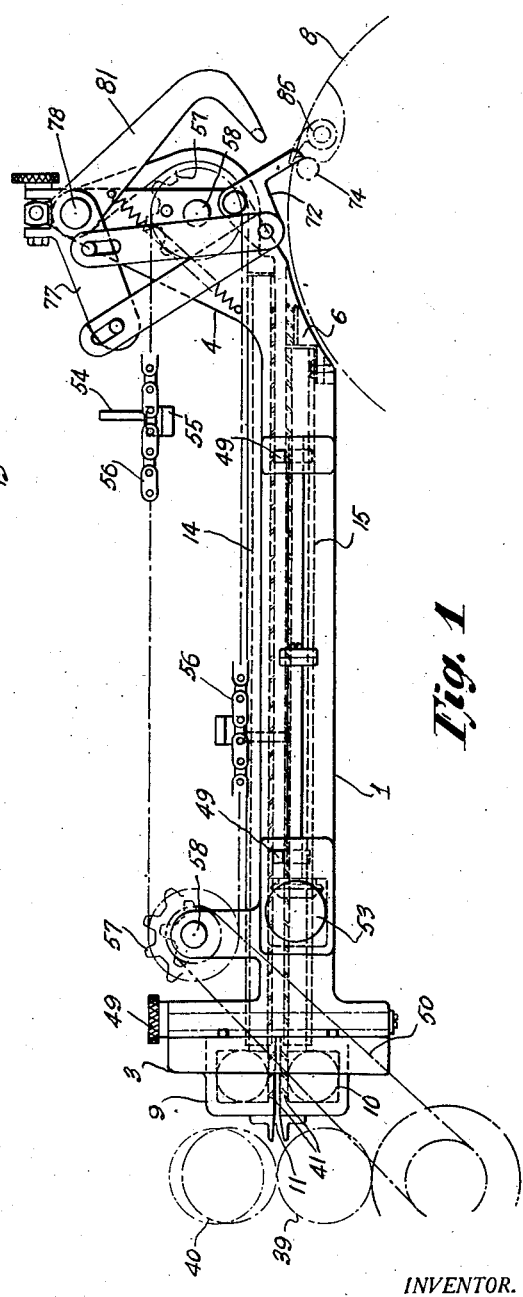
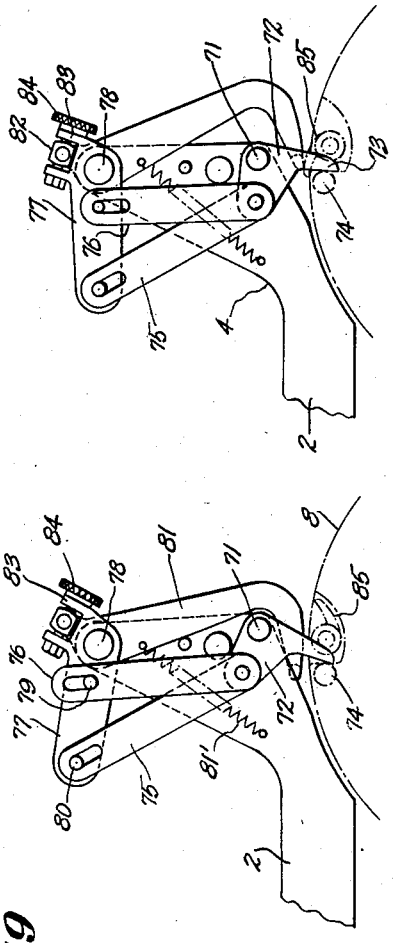
INVENTOR.
Edwin C. McFarlane
BY Cornelius Zabriskie
ATTORNEY.

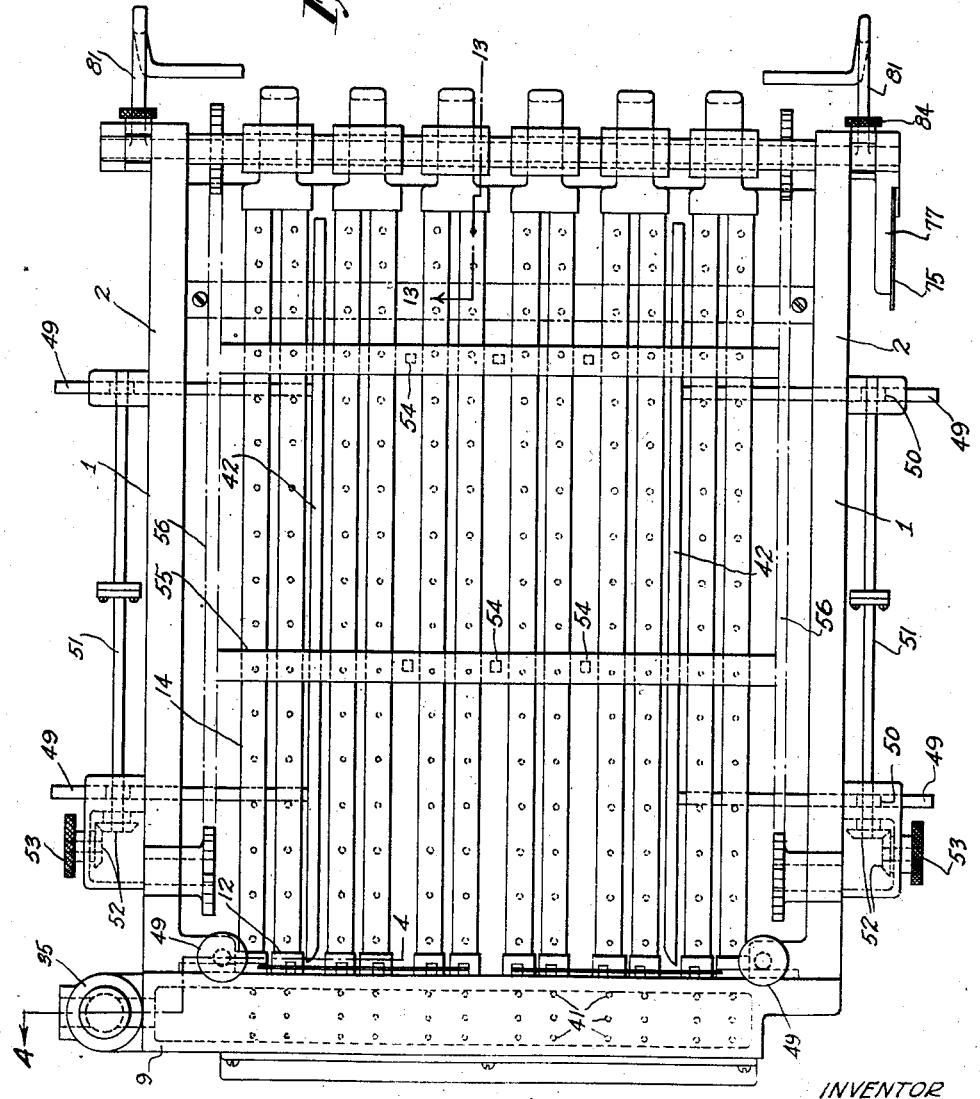

Feb. 13, 1934.   E. C. McFARLANE   1,947,211
METHOD OF AND APPARATUS FOR CONVEYING SHEET MATERIAL
Filed Aug. 27, 1931   6 Sheets-Sheet 3
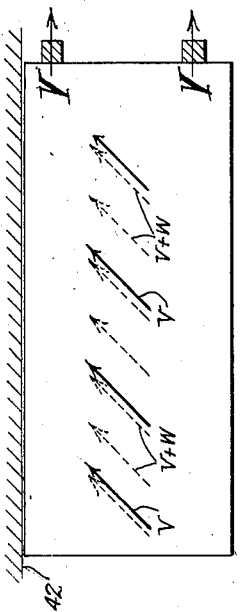
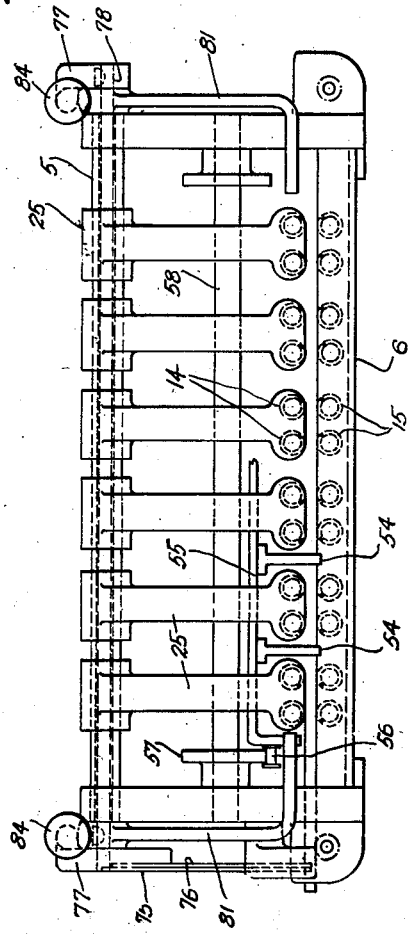
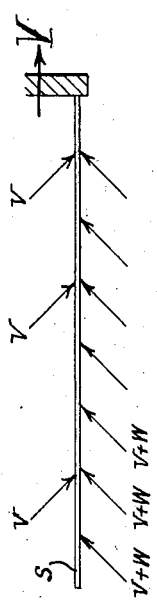
INVENTOR.
Edwin C. McFarlane
BY
ATTORNEY.

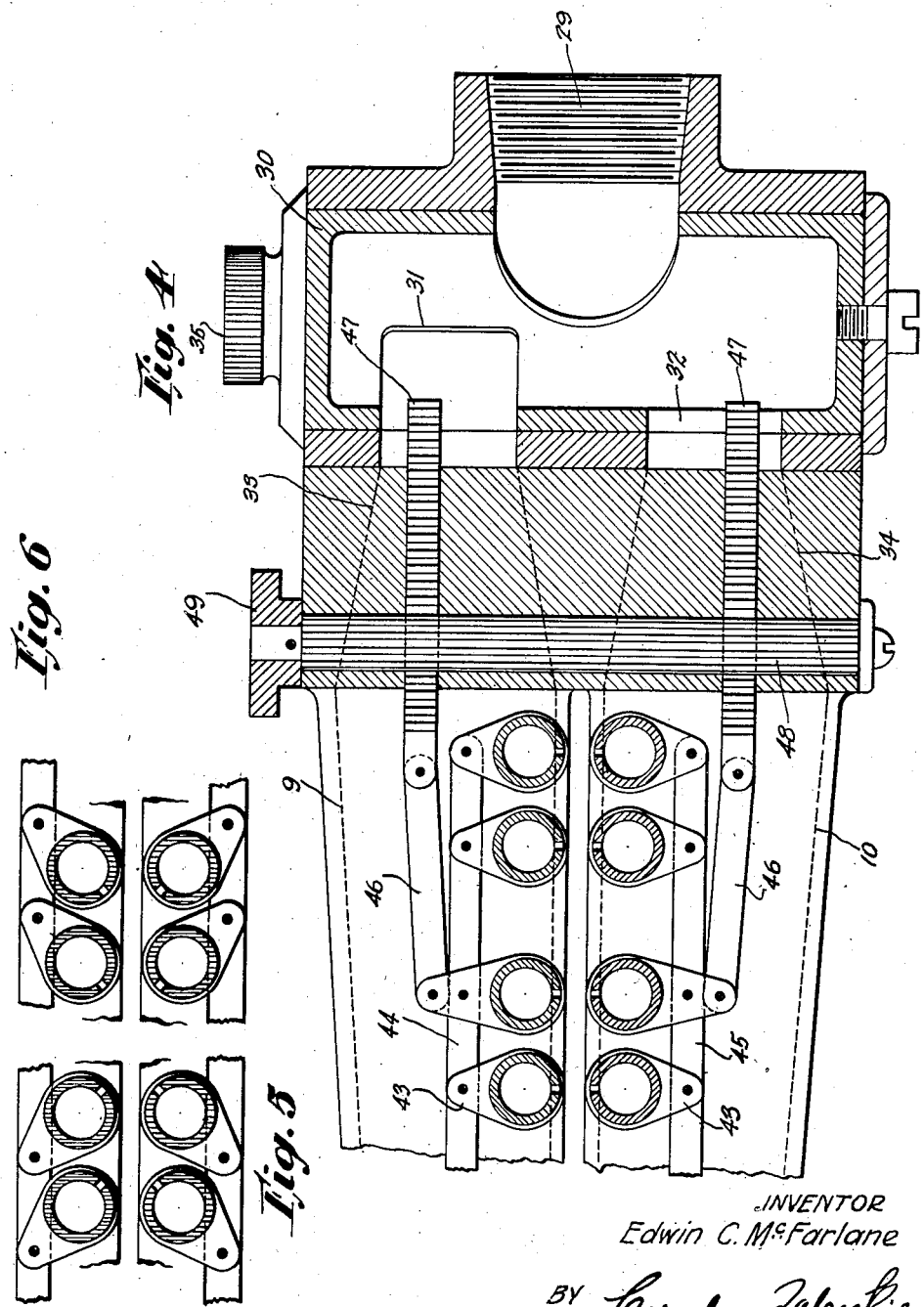

Feb. 13, 1934. E. C. McFARLANE 1,947,211
METHOD OF AND APPARATUS FOR CONVEYING SHEET MATERIAL
Filed Aug. 27, 1931 6 Sheets-Sheet 5
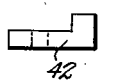
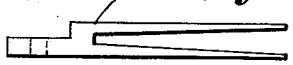
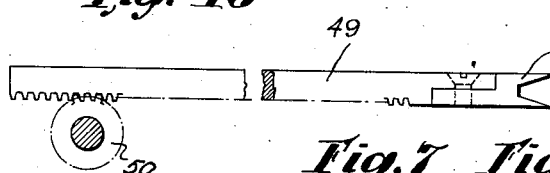
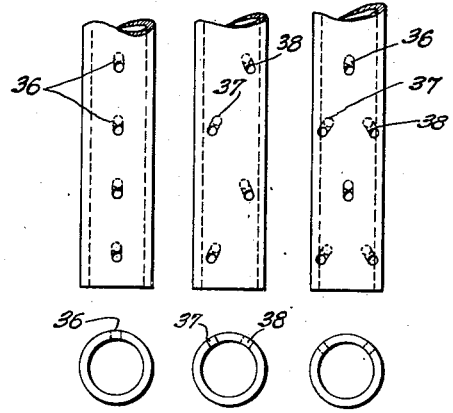
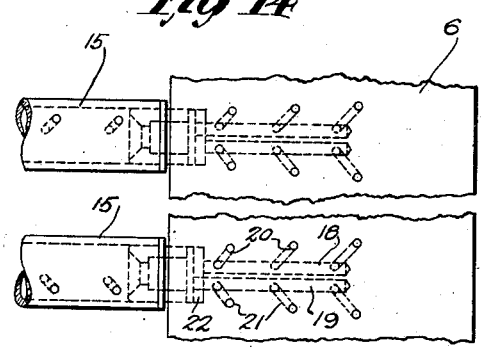
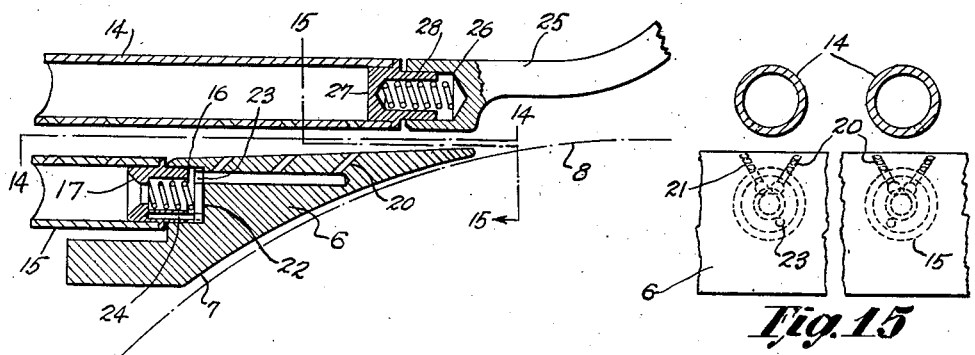
INVENTOR.
Edwin C. McFarlane
BY Cornelius Zabriskie
ATTORNEY.

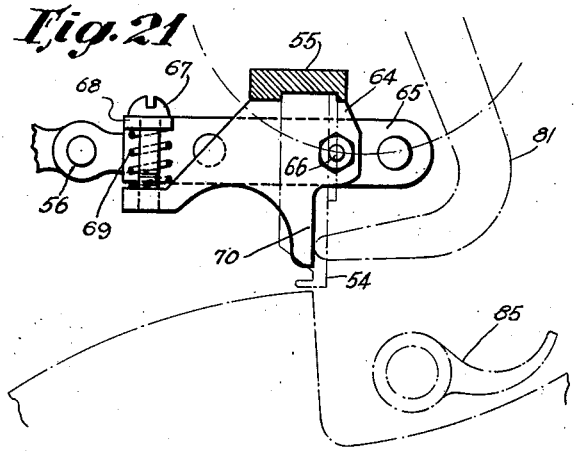
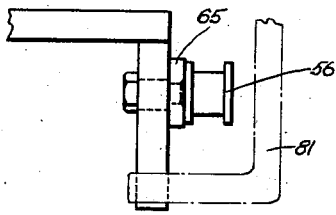
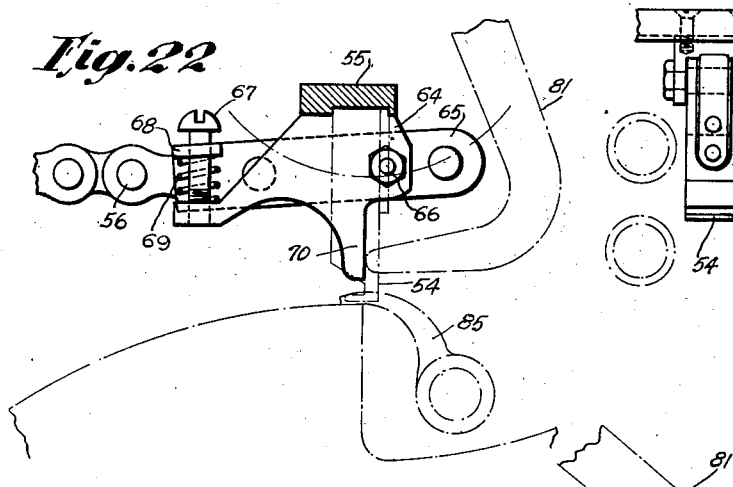
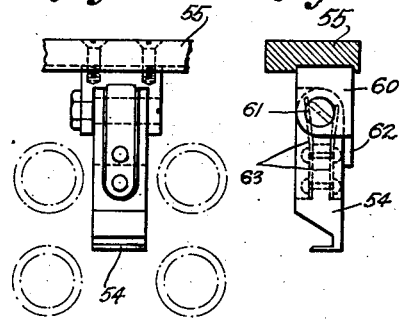
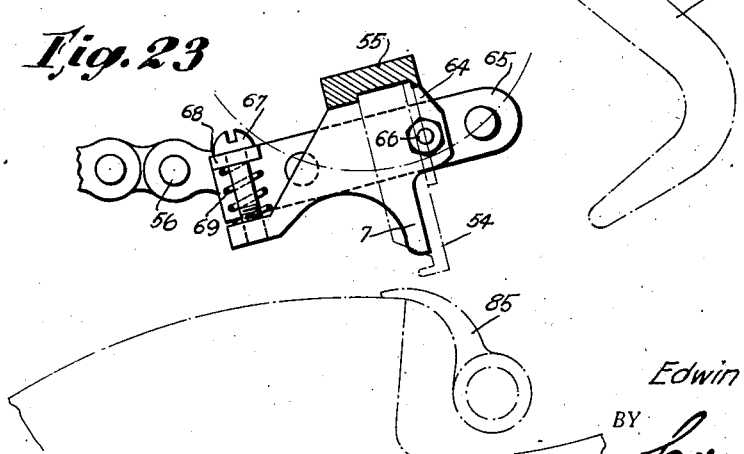

Patented Feb. 13, 1934

1,947,211

UNITED STATES PATENT OFFICE 1,947,211

METHOD OF AND APPARATUS FOR CONVEYING SHEET MATERIAL

Edwin C. McFarlane, Pearl River, N. Y.

Application August 27, 1931. Serial No. 559,624

21 Claims. (Cl. 271—48)

This invention relates to method of and apparatus for conveying and registering sheet material, such as paper, cardboard or any other material in sheet form from one point to another and while the invention is adapted for general application, it is particularly intended for employment in conveying sheets of material from a pile feeder to a printing press. Tapes and other analogous devices have long been employed for this purpose and it is the object of the present invention to provide a simple and thoroughly efficient construction which will provide for the efficient and accurate feed and registration of such sheets and at the same time eliminate the well known disadvantages inherent in the employment of feed tapes.

An important feature of this invention resides in the fact that movement is imparted to the sheet pneumatically, and the sheet may be said to "float" on a fluid atmosphere during the conveying operation. The fluid employed may be air, steam, gas or a mixture thereof and in describing this invention I wish to have it understood that wherever a pneumatic operation is referred to, mobile fluids of the character suggested are to be understood as involved in the operation.

The invention is characterized in the fact that fluid under pressure is caused to flow in a regulable direction along a predetermined path and a moving atmosphere is thus provided into which the sheet to be conveyed is introduced to be carried or floated along in said atmosphere to a predetermined point. It is extremely difficult to control the speed of movement of such an atmosphere or strata of fluid, and, accordingly, said fluid is preferably caused to move somewhat faster than the conveying speed desired and a so-called transit guide, movable at the desired predetermined speed of transportation of the sheet, is adapted to coact with and hold back the sheet so that it travels at the speed desired.

Appropriate guides are preferably provided to accurately control the direction of travel of the sheet as it floats along on the atmosphere or fluid strata to which I have referred and in cases where it is desired to synchronize the delivery of the sheet at the end of its travel in the conveying apparatus of this invention with some operating mechanism in which the sheet is subsequently to be used or acted upon, provision is made for synchronizing the speed of the sheet at the delivery point with the operating mechanism which will next coact therewith.

An important feature of this invention resides in the fact that a wide variety of materials may be conveyed in the manner specified without damage to materials of the most fragile character, and without wrinkling or distortion thereof, and such sheets may be delivered at the delivery point with perfect registration.

In one of its preferred, practical forms, the apparatus of this invention comprises upper and lower series of conduits arranged in spaced relation to form between them a substantially horizontal zone through which the sheet material is adapted to be conveyed. These conduits are provided with openings through which is discharged fluid under pressure, the openings forming jets which, preferably through movement of the conduits, are adapted to be directed in predetermined directions, so that when a sheet of material is positioned within this substantially horizontal zone between the upper and lower conduits, fluid pressure emanating from these jets impinges the upper and lower surfaces of the sheet forming both above and below the sheet moving strata of fluid which support the sheet from below, as well as above, and move the sheet in the direction of the moving currents of fluid. A guide extends laterally along the predetermined path of the sheet and the sheet slides along this guide as it is floated along in the fluid stream. The transit guide preferably takes the form of fingers or stops which move along the predetermined path in advance of the sheet and at a speed less than the moving currents of fluid, so that the sheet engages with the transit guide and is held back so as to move at the same speed as such guide which speed is that which is desired.

The conduits may conveniently be in the form of tubes in which outlet holes or jets are formed at an angle to the axis, in such a manner as to direct the fluid in predetermined directions and said tubes may be mounted to rotate about their axes in order that the direction of the jets may be controlled.

Fluid under pressure may be supplied to the upper and lower conduits as hereinbefore stated from any suitable source, but there is preferably included in the apparatus means to control a supply of such fluid under pressure, so that pressure below the sheet may be slightly greater than pressure above the sheet in order to compensate for the weight of the sheet and assure proper support for the same as the sheet is floated along its predetermined path. The apparatus, for accomplishing this result, as well as the corresponding step of the method of this invention are important practical features.

In addition to the particular features to which I have hereinbefore referred, the invention embodies numerous other features of importance insofar as concerns both the apparatus and the method of this invention, and these additional features will hereinafter more fully appear from the following specification and claims when read in conjunction with the accompanying drawings.

The accompanying drawings illustrate one practical embodiment of the invention, but the construction therein shown is to be understood as illustrative, only, and not as defining the limits of the invention.

Figure 1 is a side elevation of apparatus embodying the present invention.

Figure 2 is a plan view of the apparatus shown in Figure 1 with certain parts omitted in the interest of clearness.

Figure 3 is an end elevation of the apparatus looking from the right hand side of Figure 1.

Figure 4 is a section on the line 4—4 of Figure 2 showing the mechanism for axially adjusting the fluid conduits.

Figures 5 and 6 are fragmental sections similar to Figure 4, but showing different angular positions which the respective conduits are adapted to occupy.

Figures 7, 8 and 9 are elevations of different conduits that may be used showing different placement of the outlet jets or openings therein.

Figures 10, 11 and 12 are respectively end views of the structures shown in Figs. 7, 8 and 9.

Figure 13 is a fragmental section taken approximately in the plane of the line 13—13 of Figure 2, showing certain parts at the discharge end of the apparatus.

Figure 14 is a fragmental section on the line 14—14 of Figure 13.

Figure 15 is a section taken on the line 15—15 of Figure 13.

Figure 16 is a view showing means for operating one of the side guides. This figure shows one form of guide attached to the operating mechanism.

Figures 17 and 18 show different forms of side guide that may be associated with the mechanism of Figure 16.

Figures 19 and 20 are side elevations of a discharge end of the apparatus showing the different operating positions as compared to the showing of such parts in Figure 1. The parts in question relate more particularly to the timing of discharge of the sheet from the apparatus.

Figures 21, 22 and 23 show other parts of this discharge mechanism in different positions.

Figure 24 is an end elevation looking from the right hand side of Figure 21.

Figure 25 is an elevation of a portion of the transit guide showing its relation with respect to the upper and lower conduits.

Figure 26 is an edge view of the structure of Figure 25.

Figures 27 and 28 are diagrammatic views illustrating the operation of the method of this invention.

The apparatus as shown in the drawings comprises a frame 1 of rigid construction embodying side bars 2 arranged in parallel relation. Across one end of the frame extends a manifold member 3, which is preferably in the form of a casting and is rigid with the side bars 2. At the opposite ends of the frame, the side bars are extended upwardly to form brackets 4 and these brackets support a transverse shaft 5 which is preferably rigid with respect to the frame. The corresponding ends of the side bars are spaced apart by the shaft 5 and also by a front plate 6, shown best in Figure 13, which front plate extends transversely between the side bars with its under surface preferably curved on an arc of a circle as indicated at 7 to occupy a closely spaced relation, in the form of the invention shown, to a printing cylinder 8 of a printing press.

The manifold member 3 is cored out to provide two transversely extending chambers 9 and 10, arranged one above the other in spaced relation and between these chambers, there is provided a walled passage 11 into which the sheet material to be conveyed is adapted to be fed. The manifold member 3 may be thus said to be divided into upper and lower manifolds and the front wall of each of these manifolds is provided with a series of transversely arranged seats preferably in the form of chambered bosses 12 in each of which is seated one end of a hollow tube. The tubes which are seated in the bosses of the upper manifold are designated 14, while those which are seated in the boss of the lower manifold are designated 15. The base of each boss is cored out, so as to provide communication between the interior of each of the manifolds 9 and 10 with the interiors of the corresponding tubes 14 and 15, and while the tubes are seated in the several bosses as stated, they preferably have a close sliding fit therewith, so that these tubes may be rotated, but at the same time will have a sufficiently close fit to preclude material leakage of pressure.

The left hand ends of the tubes 14 and 15, as viewed in Figures 1 and 2, are supported above and below the horizontal plane of the passage 11, at the left hand end of the machine by the chambered bosses of the manifolds. The opposite ends of the lower tubes 15 are supported by the front plate 6, which, as shown in Fig. 13 is recessed at 16 to receive a fitting which is mounted on each tube 15. The fitting is in the form of a nipple 17 which fits into the end of the tube and also extends into the recess 16, so as to support this end of the tube.

Each fitting is rigid with respect to its corresponding tube, but has a rotary fit in its recess 16, so that while the tube is properly supported, it is nevertheless free for rotation without excessive leakage at the joint. In the base of each recess 16 is formed two channels which extend beyond the base of the recess and are indicated at 18 and 19 and these channels have branch ducts 20 and 21, respectively, which extend into the upper surface of the front plate 6. A disk valve 22 is positioned in the base of each recess and is provided with a single port 23, which through rotation of the disk valve may be brought into registration with either of the channels 18 or 19. A pin 24 carried by the disk valve extends into a socket in the corresponding fitting 17, so that as the tubes are rotated or oscillated the disk valve is correspondingly moved to open communication between the interior of any particular tube and the corresponding channels 18 or 19 selectively.

The corresponding ends of the tubes 14 are supported in yokes 25. These yokes are carried by the shaft 5, extend downwardly and inwardly in the direction of the tubes 14 and each yoke is provided with a twin socket to receive two adjacent tube ends as shown in Figures 2, 3 and 13. The sockets are designated 26 and receive fittings 27 rigid with the tubes 14. A spring 28 is positioned in each socket to hold the tube firmly in position and will permit of rotation of the tube and its fitting.

The structure as described provides upper and lower manifolds with upper and lower tubes spaced apart to provide between them a substantially horizontal passage forming a continuation of the passage 11, and which passage extends for the full length of the apparatus. It is through this passage that the sheet material to be conveyed is adapted to pass and this is accomplished as hereinbefore stated by fluid under pressure. This fluid under pressure is supplied to the respective manifolds in any desired way and from any appropriate source. This fluid may be air, steam, gas or a combination of one or more of these fluids and such fluid is fed into the manifold preferably in regulable quantities and under predetermined or regulable pressures. As a matter of fact, I may control the feed of fluid pressure into the manifolds individually or if desired I may control the feed of pressure from the manifolds to the upper or lower tubes individually or collectively.

For the purpose of illustration, however, I have shown the fluids as adapted to be fed through an inlet 29 (see Fig. 4) from a suitable source of fluid under pressure and which inlet leads into the interior of a rotary valve 30. The valve has two ports 31 and 32, the former of which is adapted to control the flow of fluid through a passage 33 leading to the upper manifold 9 and the lower of which controls the flow of fluid through a passage 34 leading to the manifold 10. The ports are set at different angular relation in the wall of the valve 30, so that by manipulating the operating knob 35 with which the valve is provided a greater or lesser amount of fluid under pressure can be fed to the respective manifolds selectively or collectively as may be desired and a very nice adjustment of the pressure in the respective manifolds may be thereby obtained. The fluid under pressure fed into the manifolds is communicated therefrom into the upper and lower tubes which tubes are each provided with openings disposed in various ways according to predetermined requirements.

For example, in Figures 7 and 10, I have shown three different ways in which the openings in the tubes may be disposed. In Figure 7, each tube is provided with a single row of openings 36 which are inclined in the direction in which the sheet is to be fed. In Figures 8 and 11, each tube is provided with two rows of openings 37 and 38 which are inclined in the direction of the feed of the sheet material and also diverge in the same general direction. In Figures 9 and 12, the tube is provided with a combination of openings 36, 37 and 38. I may use either form of openings without departing from this invention depending upon particular conditions or the stock which it is desired to feed, but I have shown in Figs. 4-6 the type of tube illustrated in Figures 7 and 10 with the single row of openings 36. These openings may be merely inclined perforations or the tubes may in practice be provided with individual nozzles of appropriate structure, so that in any event, fluid under pressure issuing from the openings thus provided will exit in the form of jets adapted to impinge the upper and lower surfaces of the sheet positioned between the upper and lower tubes. It will be apparent, moreover, that the direction at which the jets impinge the sheet may be controlled by rotation of the tubes to suit conditions as will hereinafter be more fully explained.

The sheet material to be fed may be introduced into the passage 11 manually or in any desired mechanical way. For the purpose of illustration, however, I have shown diagrammatically certain elements of a pile feeder, such as is used for printing presses, and including the rollers 39 and 40, the latter of which constitutes the conventional drop roller. Through the operation of these rollers, sheet material is fed, one sheet at a time, into the passage 11, and in order that it may be subjected at once to the conveying force of fluid under pressure in accordance with this invention, the adjacent walls of the manifolds 9 and 10 are provided with inclined perforations 41, as shown in Figure 1, and these perforations are inclined in the direction of travel of the sheet, so that fluid under pressure is adapted to immediately impinge the sheet and convey the same in the direction of the discharge end of the apparatus. As the sheet advances through the passage 11 and enters the space between the upper and lower tubes 14 and 15, fluid under pressure flowing from the openings in said tubes advance the sheet and cause the same to travel in the direction of the discharge end of the apparatus.

In order that the operation of conveying sheet material by fluid pressure in accordance with this invention may be clearly understood, let us revert to the method of the invention as graphically shown in Figs. 27 and 28. Here the sheet material is indicated by the reference character S. If it be assumed that this sheet is positioned in a substantially horizontal plane with a series of jets $v$ impinging in inclined relation on its upper surface, these jets will obviously tend to force the sheet downwardly and at the same time tend to move it forwardly. If at the same time jets of the same force are impressed against the under side of the sheet, all these jets will have the tendency to force the sheet forwardly but the weight of the sheet will overcome the pressure of the lower jets and it will gravitate into contact with any surface that may lie beneath it. However, if the jets impinging the lower surface of the sheet have a value of $v$ plus $w$ (wherein the value of $w$ is substantially that added pressure required to counterbalance the weight of the sheet) it necessarily will follow that gravity will be overcome and the sheet will be suspended in midair. Jets impinging its under side will have a lifting effect, while the jets impinging its upper side overcome the lifting effect of the lower jets and produce in effect a balanced condition in a vertical direction. Nevertheless the tendency of the jets $v$ which are impinging the sheet in an inclined direction will be augmented by the tendency of the jets $v$ plus $w$ which are also impinging the sheet in an inclined direction, so that, as a result of these forces, the sheet will be moved in a forward direction.

To view the method from another standpoint, the jets below the sheet will form in effect a blanket or strata of fluid moving in a predetermined direction and acting against the sheet with sufficient force to overcome its weight, while the jets from the upper tubes will form an upper blanket or strata of air moving in the same general direction, but steadying the sheet and holding it down upon the lower strata of air, so that the sheet is caused to float in the general direction desired. It is, however, difficult in dealing with sheet material, which may be of a more or less flexible character, to effectually control the direction of the movement of the sheet wholly by air pressure and I have therefore found it desirable to mechanically guide the sheet during its movement by providing along its path of movement a lateral guide or abutment indicated in Fig. 28 by the reference character 42. This abutment is a straight abutment which may extend along one side of the sheet only or if desired there may be abutments along opposite sides of the sheet. It is found entirely practical however to provide an abutment along one side of the sheet only and to direct the air currents against the sheet in such directions as to tend to keep the edge of the sheet in contact with the lateral guide 42. Thus, it is desirable in the arrangement shown that the jets $v$ and $v$ plus $w$ incline not only in a forward direction, but also slightly in the lateral direction of the abutment 42. As a result, the sheet, while being impelled in a forward direction by the moving air strata, will be impelled in the direction of the abutment 42 with the result that as the sheet moves forwardly it will slide along the abutment 42 and thus perfectly accurate lateral registration is obtained.

I have found it difficult in feeding sheet material to accurately control the exact speed of such material if fluid pressure is depended upon exclusively and it is therefore found desirable to control the actual speed mechanically. Accordingly, and as shown in Figures 27 and 28, I provide members indicated by the reference character V. These members may be termed transit guides for the reason that they govern the speed of transit or movement of the sheet through the apparatus. They are designated by the reference character V because they control the velocity of actual travel. They are moved mechanically by any suitable apparatus, so as to move at a fixed and predetermined speed along the path of movement of the sheet and the sheet is impelled by the air occurrence as stated at a speed slightly in excess of the speed of the transit guides, so that as the sheet moves along, it is held back slightly by the transit guides, and maintained at the exact speed which it is desired to have the sheet travel. It may be desirable at the discharge end of the apparatus to vary the speed of the sheet somewhat as will hereinafter be more fully explained in order to get proper timing with apparatus adapted to substantially coact with the sheet, but it is the function of the transit guides to coact with the sheet for at least the greater portion of its movement to effectually control and regulate its speed.

From what has been said with reference to the method of this invention, it will be apparent that as the sheet advances through the passage 11 and enters the space between the upper and lower tubes, these tubes should be so set that the fluid pressure will issue therefrom in the desired directions. The apparatus of this invention provides for the regulation of the tubes to accomplish this result and a very convenient way of doing this, is shown in Figs. 4 to 6. Here each of the tubes is shown as provided with an arm 43. The arms 43 of the upper tubes extend in an upward direction and they are fastened together by a link 44, while the arms of the lower tubes are shown as extending in a downward direction and they are secured together by a link 45. All of the tubes for the full width of the apparatus may be connected by the links 44 and 45 as stated, but, in practice, I preferably connect the tubes in groups. Thus by reference to Figure 2, the six upper tubes at either side of the apparatus are connected together and the same is true of the lower tubes, so that these tubes may be regulated in groups. Other divisions for regulation may be provided for if desired. However, as shown each group of tubes which are linked together are connected by a link 46 with a rack 47 and these racks mesh with an elongated toothed arbor 48 provided with a finger piece or hand wheel 49 by which the arbor may be rotated manually, see Fig. 4. Through the operation of these arbors, the respective groups of tubes may be regulated to control the direction of application of fluid pressure to the sheets, as will be clear from Figures 4 to 6, wherein different positions of the parts are shown.

The lateral guide to which I have referred and the mechanism for operating the same is shown best in Figures 1, 2, 16, 17 and 18. The guide itself is designated 42 and one is shown at each side of the apparatus, so that two sheets may be passed side by side through the apparatus with one edge of each sheet cooperating with one of the guides. The guides may be shaped as shown in Figs. 16, 17 and 18 or they may be made of any other appropriate shape, although I find that the forked or channeled edge guide operates with high efficiency for guiding various kinds of light sheet material. The guides 42 are supported upon racks 49 which extend out through the side bars 2 and mesh with pinions 50 mounted on shafts 51. The shafts 51 are connected by bevel gears 52 to finger pieces or hand wheels 53 which may be manipulated to move the guides laterally of the apparatus in order to effect their accurate adjustment.

The so-called transit guides to which I have referred generally by the reference character V in Figs. 27 and 28 may partake of different practical forms, without departing from this invention, but for the purpose of illustration, I have shown these guides as comprising a plurality of fingers 54, one of which is shown in detail in Figures 25 and 26. These fingers are mounted upon cross bars 55 which are secured at their opposite ends to sprocket chains 56 which pass about sprockets 57 carried by shafts 58. One of the shafts 58 is driven through an additional sprocket chain 59 from the pile feeder or from any other suitable source of power capable of driving the chain 56 at the desired speed. The sprockets 57 are so disposed that as the chain 56 travels, the fingers 54, during their movement to the right in Figs. 1 and 2, extend downwardly between the upper tubes and project into the path of the sheet through the apparatus, so that as these fingers move along, they travel in the path of the sheet and in advance of the sheet to operate in a manner hereinbefore described for the purpose of retarding the speed of the sheet and causing it to advance at a predetermined velocity.

I have hereinbefore referred to the side guides 42 as adjustable laterally and it is entirely possible that under certain lateral adjustments, these side guides may occupy positions in the path of the transit guide fingers 54. For this reason, the fingers are preferably so mounted on the cross bars 55 as to permit them to be retracted either manually or automatically in the event they meet obstruction. A very simple means of accomplishing this result is shown in Figs. 25 and 26. Each finger 54 is pivoted to a bracket 60 on a pivot pin 61. The bracket is rigid with the cross bar 55 and has a depending stop or shoulder 62 which precludes pivotal movement of the finger 54 beyond vertical position in a forward direction, although the finger is adapted to be swung in a rearward or clockwise direction. Springs 63 carried by the finger bear against the pivot pin and maintain it against inadvertent pivotal movement, so that it will set in the position in which it is placed either manually or automatically.

With this arrangement, it will be apparent that if the side guides are adjusted to a position wherein they will lie in the path of one or more of these transit guide fingers the fingers will, upon engagement with the side guides or their supporting means, immediately be retracted, so as not to interfere with the operation of the apparatus. It should be clearly understood in connection with these transit guide devices which I have described that they may partake of various forms and they may operate upon the sheet above or below or from the side or in any other suitable way without departing from this invention, so long as they form the necessary operation of holding back the movement of the sheet so that it travels at the desired speed.

In feeding sheet material to a printing machine, it has heretofore generally been the practice particularly in tape feeders to feed the sheet to a particular point, and thereupon stop the sheet and permit it to momentarily remain at rest, so far as the feed is concerned, while it is moved or adjusted into a position of accurate registration. After being so positioned, it has been picked up by the grippers and moved into printing position. According to the present invention when used in conjunction with printing machines, this prior operation is wholly dispensed with in that the sheet is not stopped, released, registered and then gripped. On the contrary, I find it desirable to bring the sheet up to a point of engagement by the grippers in an accurate position of registration, to slightly decrease its speed to permit the grippers to more readily engage the same and to thereupon cause the grippers to act upon it immediately.

The mechanism whereby this result is accomplished is shown best in Figs. 1 and 19-24. By reference to Figs. 21 and 24, it will be noted that the cross bar 55 which carries the transit guide fingers is not rigidly mounted upon the links of the chain which carry it. On the contrary, it is mounted upon a pair of triggers, 64 which are, in turn, supported on plates 65 securely fastened to the links of the chains and bridging two or three of these links. Each trigger is supported on its plate 55 for pivotal movement on a pawl or rivet 56 and at a point distant from this pivot, it carries a stud 67 which passes loosely through a lug 68 on the plates 65 and threads into the trigger. A compression spring 69 is interposed between the plate and the lug and when the spring is normally acting to keep the parts in normal position, the head of the studs bears against the lug while a depending shoulder 70 occupies a substantially vertical position. When the parts are in this position, the transit guide fingers 54 are also in vertical position and this is the relation of the parts as these fingers move along and control the velocity of the web to substantially the point of discharge from the apparatus. Mounted on the upstanding brackets 4 of the frame 1 are pivots 71 (see Figs. 19 and 20). One of these pivots may be positioned at each side of the machine if desired although a single pivot at one side of the machine will suffice as shown in the drawings.

On the pivot 71 is mounted a bell crank 72, one arm 73 of which bell crank extends downwardly and into the path of a pin 74 adapted to be carried by the printing cylinder 8. The other arm of the bell crank has pivoted thereto two links 75 and 76 which, in turn, have pivotal connection with an arm 77 fixed to a shaft 78 which extends through the shaft 5, the latter being hollow or tubular. It will be noted that the pivotal connections between the links and the arm 77 are the pivots 79 and 80 which are at different radial distances from the shaft 78, and it will also be noted that there is a slotted connection between each of the links and their respective pivots. Loosely mounted on the shaft 78 adjacent each arm 77 (one of which is positioned at each side of the apparatus) is a restraining arm 81. Each of these restraining arms has adjacent its hub a laterally extending finger 82 which extends through a bifurcation 83 in the adjacent arm 77 and an adjusting screw 84 passes through the bifurcation and through the projection 82 and may be manipulated to adjust the angular relation between the arms 77 and 81 so that a very nice adjustment may be obtained. The restraining arms 81 extend downwardly and rearwardly and are adapted to coact with the stop abutment 70, as shown in Figs. 21-24.

The operation of the mechanism is as follows:

As the sheet approaches the discharge end of the apparatus, the position of the parts is as shown in Fig. 19. Here the retarding arms are in the positions to engage with the stop abutments 70 and as the abutment travels along, it engages with these arms and movement of the abutment is arrested. The chains 56, however, continue to move and the springs 69 at each side of the machine are compressed to compensate for this movement, so that while the movement of the chains continue the actual movement of the fingers 54 ceases. At about this time, a pin on the printing cylinder 8 engages with the arm 73 of the bell crank 72 and moves this bell crank as shown in Fig. 19. By virtue of the slotted connection between the link 75 and the pin 80, the arm 70 is made immediately responsive to the movement of the link 75 and said arm 70 is drawn downwardly in a counterclockwise direction and imparts movement to the retarding arm 81, thereby permitting the sheet to move slowly forward, until the parts reach the positions of Figure 20 at which time the grippers 85 have moved into a position to grip the sheet. At this instant, the pin 79 has reached the upper end of the slot in the link 76 and this link thereupon acts directly upon the arm 77 on a relatively short radius giving the arm 77 a quick downward impulse and throwing the restraining arms 81 out of engagement with the abutments 70 to release the sheet and permit it to be carried away by the grippers 85 on to the cylinder 8.

The actual operation of the grippers, as well as the restraining arms, and the action of the latter upon the triggers 64 will be clearly understood from Figs. 21-23. Figure 21 shows the parts at the instant when the abutments 70 engage with the restraining arms. Fig. 22 shows the parts in the positions at the instant prior to the time when the restraining arms are thrown out of restraining position, and Figure 23 shows the position of the parts at the instant after the transit guide has relinquished control of the sheet and control of the sheet has been taken by the grippers.

It will be noted that the spring 81' normally retains the parts in the positions of Figure 19. This spring yields to permit actuation of said parts by the pin 74 but serves to return said parts to normal positions after the pin has passed out of cooperative relation with said parts. In practice, the operations described occur almost instantaneously and while I have referred to a stopping of the sheet at the beginning of the operation in order to make the operation clear, there is in practice practically no stopping of the sheet when the parts are properly adjusted because these parts are so synchronized that the pins 74 on the printing cylinder will engage with the bell crank 72 simultaneously with the engagement of the restraining fingers with the abutments 70. Thus if the transit guide is operated at proper speed, there will be no actual stopping of the sheet. However, it is extremely difficult to obtain such fine adjustment and it is therefore desirable to have the sheet move somewhat in advance of the cylinder and then synchronize the operations by engagement of the pin on the cylinder with the bell crank 72.

My experience with apparatus of the character described has shown the same to be highly efficient and thoroughly dependable in the carrying out of its intended functions. The parts are of relatively simple efficient construction and none of these parts are apt to get out of order. The feed of all sheets is uniform for any particular adjustment and the most fragile material may be fed without damage thereto. There are no sudden stops and starts in the movement of the sheet, but it is gently handled at all times.

I have found it convenient in the building of this apparatus and in describing the same to show the conduits 14 and 15 in the form of tubes. I am aware, however, that these conduits may be in the form of cast plates above and below the path of travel of the sheet and that these plates or units may be of various forms without departing from this invention. I do not therefore limit the structure to the particular details herein shown and described, but the invention is to be understood as including all equivalents.

It may be noted in connection with the air conduits that it is desirable to advance a sheet as far as possible by the air pressure as specified by virtue of the proximity of the printing cylinder 8, and it is practical to make the lower tubes 15 somewhat shorter than the tubes 14, as shown in Fig. 13 and to supply air for the extra length through the channels and ducts 18, 19, 20 and 21, as will be apparent from this figure, as well as from Figs. 14 and 15. It should be noted in this regard that the direction of the air is controlled above the front plate 6 by the valves 22 for as the tubes 15 are rotated to give the adjustment desired, the valve 22 will be likewise rotated to selectively open communication between the interior of the tubes 15 and the ducts 20 or 21. In this way, the air may be controlled for the full length of travel of the sheet as will be clearly understood.

In associating an apparatus of the character described with a printing machine or the like, it is desirable that it be mounted for pivotal movement so that it can be moved out of the way of printing machine when desired. Thus in practice, I preferably provide the frame 1, near its inlet end, with alined laterally projecting trunnions adapted to be supported in suitable stationary bearings for pivotal movement on a horizontal axis. With this arrangement it can be swung up and out of the way of the press on the axis of these trunnions. Furthermore, by this pivotal mounting, an angular adjustment is obtained, whereby the apparatus may deliver horizontally or in an upwardly or downwardly inclined direction, depending upon the peculiarities of the machine to be fed thereby.

The foregoing detailed description sets forth the invention in its preferred practical form, I am aware, however, that the apparatus may be varied, as by the substitution of equivalents, without departing from this invention. Furthermore, the apparatus and method embody many novel features, some of which may be used without necessarily employing all. For these reasons the invention is to be understood as fully commensurate with the appended claims.

Having thus fully described my invention, what I claim as new and desire to secure by Letters Patent is:

1. The method of conveying sheet material, which consists in placing a sheet of material in substantially horizontal position, directing blasts of fluid against both its upper and lower surfaces in angular relation to the surfaces of the sheet and in the same general direction to cause the sheet to travel edgewise at a speed in excess of that desired, and restraining the sheet to cause it to travel at the speed desired.

2. The method of conveying sheet material, which consists in placing a sheet of material in substantially horizontal position, directing blasts of fluid against both its upper and lower surfaces in angular relation to the surfaces of the sheet and in the same general direction to cause the sheet to travel edgewise at a speed in excess of that desired, and restraining the sheet by pressure against its forward edge to cause it to travel at the speed desired.

3. The method of conveying sheet material, which consists in placing a sheet of material in substantially horizontal position, directing blasts of fluid against both its upper and lower surfaces in angular relation to the surfaces of the sheet and in the same general direction to cause the sheet to travel edgewise at a speed in excess of that desired, and moving an abutment in advance and in the path of the sheet at a speed which it is desired to have the sheet travel so that the said abutment restrains the movement of the sheet and holds it to the desired speed.

4. The method of conveying sheet material which consists in placing a sheet of material in substantially horizontal position with one lateral edge adjacent an abutment extending along and defining one edge of a predetermined path of travel of the sheet, and then directing blasts of fluid against both the upper and lower surfaces of the sheet in such inclined directions that the resultant of forces of said blasts will convey the sheet along said predetermined path with its lateral edge in engagement with the abutment.

5. The method of conveying sheet material which consists in placing a sheet of material in substantially horizontal position with one lateral edge adjacent an abutment extending along and defining one edge of a predetermined path of travel of the sheet, and then directing blasts of fluid against both the upper and lower surfaces of the sheet in such inclined directions that the resultant of forces of said blasts will convey the sheet along said predetermined path with its lateral edge in engagement with the abutment, and at a speed in excess of that desired, and restraining the velocity of the sheet to cause it to travel at the desired speed.

6. The method of conveying sheet material which consists in placing a sheet of material in substantially horizontal position with one lateral edge adjacent an abutment extending along and defining one edge of a predetermined path of travel of the sheet, and then directing blasts of fluid against both the upper and lower surfaces of the sheet in such inclined directions that the resultant of forces of said blasts will convey the sheet along said predetermined path with its lateral edge in engagement with the abutment, and at a speed in excess of that desired, and moving a second abutment in the path and in advance of the sheet at a speed which it is desired to have the sheet travel so that this abutment restrains sheet and holds it to the desired speed.

7. The method of conveying sheet material, which consists in placing a sheet in substantially horizontal position, directing blasts of fluid against both its upper and lower surfaces in angular relation to said surfaces and in the same general direction, and regulating the strength of the blasts so that the sheet will be suspended and transported between and by the upper and lower fluid strata thus produced.

8. The method of conveying sheet material which consists in floating a sheet of material edgewise on a moving fluid atmosphere at a speed in excess of that desired, simultaneously guiding the sheet laterally and restraining it forwardly to control its path and speed.

9. In an apparatus of the character described, spaced apart conduits forming between them a passage through which sheet material is adapted to travel, and means for supplying fluid under pressure to said conduits, said conduits having openings inclined in a direction longitudinally of the passage and through which openings fluid is adapted to be discharged into said passage to impinge the surfaces of a sheet therein, for the purpose of moving the sheet edgewise longitudinally of said passage.

10. In an apparatus of the character described, spaced apart conduits forming between them a passage through which sheet material is adapted to travel, and means for supplying fluid under pressure to said conduits, said conduits having openings inclined in a direction longitudinally of the passage and through which openings fluid is adapted to be discharged into said passage to impinge the surfaces of a sheet therein, for the purpose of moving the sheet edgewise longitudinally of said passage, and means for guiding the sheet rectilinearly through the passage.

11. In an apparatus of the character described, superimposed spaced apart upper and lower conduits forming between them a passage through which a sheet of material is adapted to travel, a guide extending longitudinally of the passage to engage with and guide the lateral edge of a sheet passing therethrough, and means for supplying fluid under pressure to said conduits, said conduits having openings inclined in a direction longitudinally of the passage and also inclined in the direction of the guide and through which openings fluid is adapted to be discharged from the conduits into the passage to impinge upon both the upper and lower surfaces of a sheet therein, for the purpose of moving it longitudinally of the passage and simultaneously maintaining it in engagement with said guide.

12. In an apparatus of the character described, superimposed spaced apart upper and lower conduits forming between them a passage through which a sheet of material is adapted to travel, a guide extending longitudinally of the passage to engage with and guide the lateral edge of a sheet passing therethrough, and means for supplying fluid under pressure to said conduits, said conduits having openings inclined in a direction longitudinally of the passage and also inclined in the direction of the guide and through which openings fluid is adapted to be discharged from the conduits into the passage to impinge upon both the upper and lower surfaces of a sheet therein, for the purpose of moving it longitudinally of the passage and simultaneously maintaining it in engagement with said guide, and means for selectively controlling the supply of fluid to the upper and lower conduits for the purpose of regulating the discharge of fluid from each of them.

13. In an apparatus of the character described, spaced apart conduits forming between them a passage through which sheet material is adapted to travel, and means for supplying fluid under pressure to said conduits, said conduits having openings inclined in a direction longitudinally of the passage and through which openings fluid is adapted to be discharged into said passage to impinge the surfaces of a sheet therein, for the purpose of moving the sheet edgewise longitudinally of said passage in combination with an element mounted for movement longitudinally of the passage in the path and in advance of a sheet therein, and means for moving said element at the desired speed whereby such sheet is precluded from travelling in excess of such desired speed.

14. In an apparatus of the character described, spaced apart conduits forming between them a passage through which sheet material is adapted to travel, and means for supplying fluid under pressure to said conduits, said conduits having openings inclined in a direction longitudinally of the passage and through which openings fluid is adapted to be discharged into said passage to impinge the surfaces of a sheet therein, for the purpose of moving the sheet edgewise longitudinally of said passage, and means for selectively controlling the amount of fluid discharged from each conduit into said passage.

15. In an apparatus of the character described, spaced apart conduits forming between them a passage through which sheet material is adapted to travel, and means for supplying fluid under pressure to said conduits, said conduits having openings inclined in a direction longitudinally of the passage and through which openings fluid is adapted to be discharged into said passage to impinge the surfaces of a sheet therein, for the purpose of moving the sheet edgewise longitudinally of said passage, and means for varying the inclination of discharge of such fluid with respect to the sheet.

16. In an apparatus of the character described, superimposed upper and lower series of conduits spaced apart to form between them a passage for sheet material, each of said series comprising a plurality of hollow members having inclined apertures in their walls and mounted for rotary adjustment, means for supplying fluid under pressure to said members and which fluid is adapted to be discharged through said apertures into the passage in the form of blasts adapted to impinge a sheet of material therein for the purpose of imparting edgewise movement thereto in a direction longitudinally of the passage, a lateral guide extending longitudinally of the passage, and means for rotatably adjusting the hollow members to laterally incline the blasts in the direction of the guide to cause the sheet to hug the guide during its travel through said passage.

17. In an apparatus of the character described, superimposed upper and lower series of conduits spaced apart to form between them a passage for sheet material, each of said series comprising a plurality of hollow members having inclined apertures in their walls and mounted for rotary adjustment, means for supplying fluid under pressure to said members and which fluid is adapted to be discharged through said apertures into the passage in the form of blasts adapted to impinge a sheet of material therein for the purpose of imparting edgewise movement thereto in a direction longitudinally of the passage, a plurality of guides extending longitudinally of said passage, and means for rotatably adjusting predetermined upper and lower groups of hollow members to laterally incline their respective blasts toward a particular guide so that a sheet moving through the passage in juxtaposition with a particular group of hollow members will hug the corresponding guide.

18. In an apparatus of the character described, a frame mounted for pivotal movement on a horizontal axis, upper and lower manifolds carried by said frame, means to supply fluid under pressure thereto, conduits connected to each manifold and adapted to be supplied with fluid under pressure therefrom, said conduits being spaced apart to provide a passage through which sheet material may travel, and each of said conduits having apertures inclined in a direction longitudinally of the passage to direct blasts of fluid upon the upper and lower surfaces of a sheet in the passage for the purpose of imparting movement to the sheet longitudinally of the passage, means for laterally guiding the sheet during such movement.

19. In an apparatus of the character described, means for pneumatically impelling a sheet of material edgewise along a predetermined path at a speed in excess of that desired, and means movable in advance of the sheet at the desired speed to control and retard the movement of the sheet.

20. In an apparatus of the character described, means for pneumatically impelling a sheet of material edgewise along a predetermined path at a speed in excess of that desired, a member movable in advance of the sheet at a predetermined slower speed to slow down the sheet to the speed desired during a predetermined portion of the travel of the sheet and until the sheet reaches the discharge end of the apparatus, in combination with, a machine to which the sheet is adapted to be fed from the discharge end of the apparatus, and means operable by said machine to synchronize the movement of said member with the said machine at the discharge end of the apparatus.

21. In an apparatus of the character described, means tending to pneumatically impell a sheet of material edgewise along a predetermined path at a speed in excess of that desired, transit guide mechanism comprising a part movable in advance of the sheet at a fixed speed through a predetermined zone to retard and control the speed of the sheet through said zone, and means operable at the discharge end of said zone to adjust the speed of said movable part to timed relation with the next mechanism adapted to act upon the sheet.

EDWIN C. McFARLANE.